United States Patent
Eggert, Jr.

[15] 3,641,604
[45] Feb. 15, 1972

[54] CLOSURE APPARATUS

[72] Inventor: Walter S. Eggert, Jr., Huntingdon Valley, Pa.

[73] Assignee: Boothe Airside Services, Inc.

[22] Filed: May 27, 1970

[21] Appl. No.: 40,834

[52] U.S. Cl............................................................14/71
[51] Int. Cl........................................................B65g 11/00
[58] Field of Search................................................14/71, 72

[56] References Cited

UNITED STATES PATENTS

| 3,086,152 | 4/1963 | Lodjic | 14/72 X |
| 3,099,847 | 8/1963 | Lodjic | 14/71 |
| 3,121,243 | 2/1964 | Phillips | 14/71 |
| 3,310,823 | 3/1967 | Preiss | 14/71 |
| 3,363,273 | 1/1968 | Chitwood | 14/71 |
| 3,369,264 | 2/1968 | Kurka | 14/71 |
| 3,479,677 | 11/1969 | Burns | 14/71 |
| 3,484,883 | 12/1969 | Van Marle | 14/71 |

*Primary Examiner*—Nile C. Byers, Jr.
*Attorney*—Harold T. Stowell, Harold L. Stowell, Albert Tockman and Thomas J. Greer, Jr.

[57] ABSTRACT

Closure apparatus for a walkway which closes the small gap remaining after the walkway has been aligned with a doorway opening in a structure such as a parked airplane. The apparatus will follow lateral excursions of the airplane with a constant contact force. The face of the apparatus is sufficiently flexible to mate with the side surfaces of most present-day commercial airplanes.

10 Claims, 8 Drawing Figures

INVENTOR.
WALTER S. EGGERT, JR.
BY
William R. Nolte
AGENT

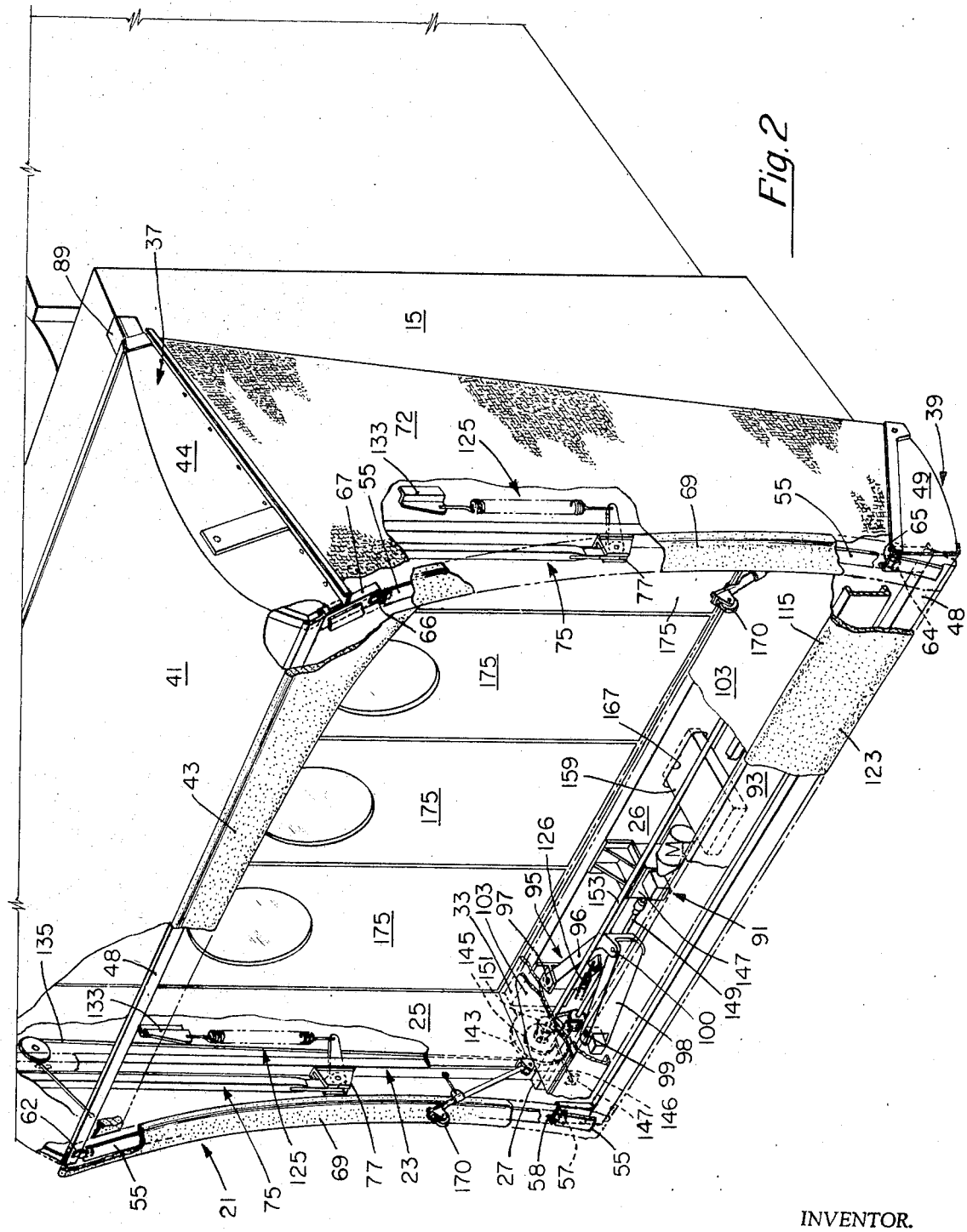

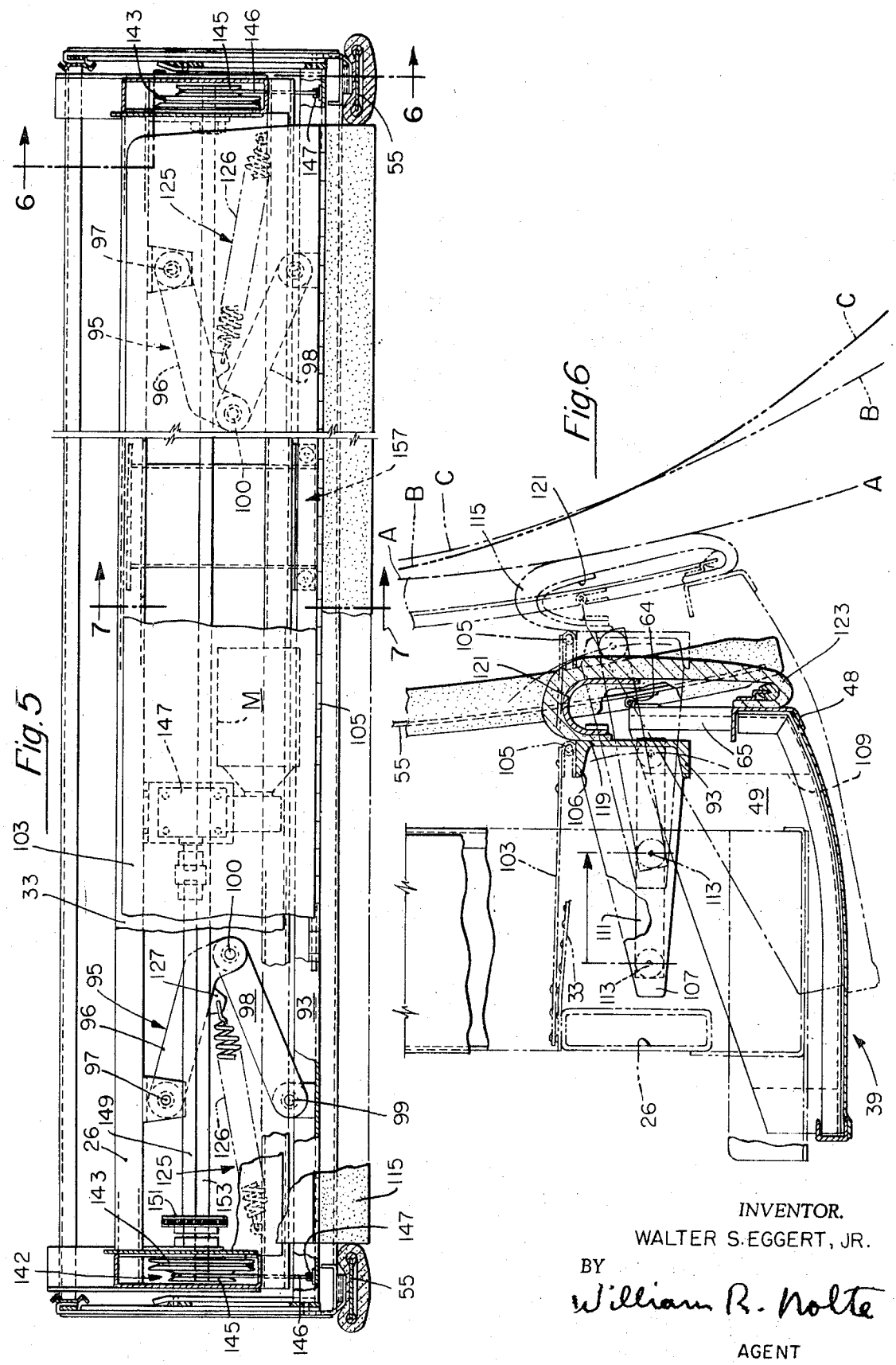

CLOSURE APPARATUS

This invention relates to a closure apparatus for a walkway to accommodate loading and unloading of passengers from vehicles such as parked aircraft. The walkway may be of the type shown and described in U.S. Pat. No. 3,404,471, entitled "Conveyance Loading Apparatus," to J. C. Wollard et al. The above patent illustrates a power-driven ramp walkway structure pivotally mounted on one end of a pedestal adjacent a terminal building, and having suitable power means to cause the ramp sections to be positioned relative to one another in a telescoping fashion to substantially close the gap between the building and a parked aircraft. A rotatable vestibule having a pivotal hood at the end of the walkway is then suitably aligned with the doorway opening in the aircraft and subsequently moved until it makes contact with the sides of the aircraft. Frequently such movements are accomplished in a careless manner. Due to the rigid floor construction of the vestibule and the fact that the floor is frequently brought into hard contact with the aircraft, the fuselage skin surfaces of the aircraft are often damaged. Moreover, in other instances wind loads striking the aircraft impart lateral in-out movements to the parked aircraft and thereby further damage the skin of the aircraft.

It is an object of this invention therefore to provide an improved mating apparatus for a walkway to close the gap between it and a structure which avoids one or more of the disadvantages of the prior art arrangements.

It is another important object of this invention to provide an apparatus for a walkway to close the small gap between the end of the walkway and a structure such as a parked aircraft, wherein the apparatus follows the in-out excursion of the parked vehicle while exerting a gentle substantially uniform contact closure force with the external surface of the aircraft.

In accordance with the invention, apparatus is provided for a walkway for closing the gap between the walkway and a structure such as a parked aircraft. The closure apparatus comprises canopy means extending transversely of the walkway and includes means supporting the canopy between a retracted position and a forward extended position relative to the end of the walkway. Resilient means are provided to urge the canopy means to a forward extended position and releasable retracting means normally oppose the resilient means to secure the canopy means in a retracted position. The retractable means upon being released enables said resilient means to urge said canopy means forward into pressure contact with the parked aircraft.

For a better understanding of the present invention, together with other and further objects thereof, reference is had to the following description taken in connection with the accompanying drawing and the appended claims.

In the drawing,

FIG. 2 is a perspective view, partially schematic and with parts thereof broken away showing the apparatus of the present invention;

Figure 7:
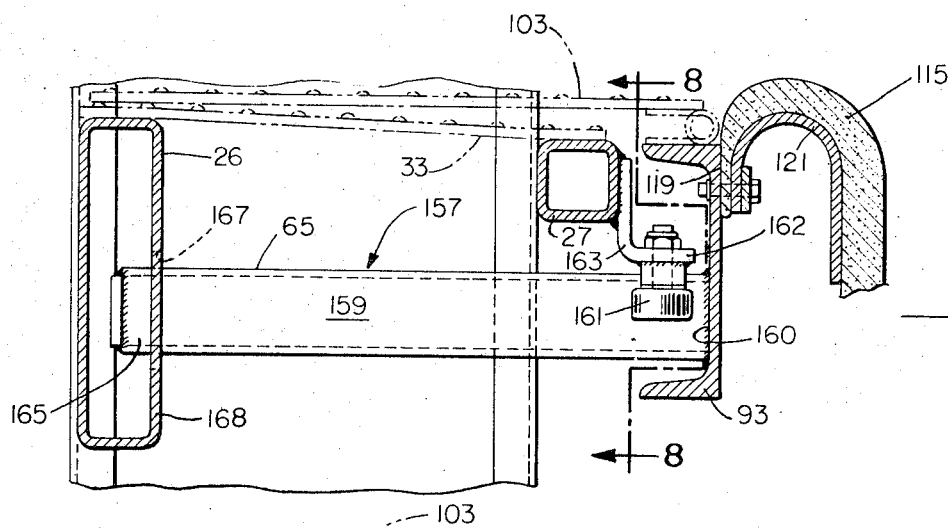
Figure 8:
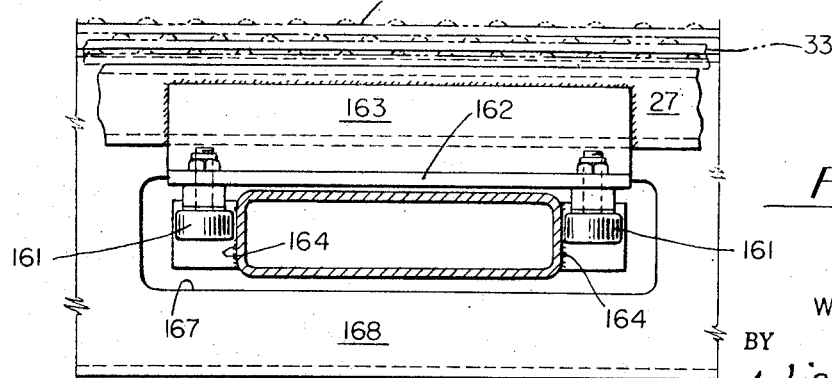
Figure 3:
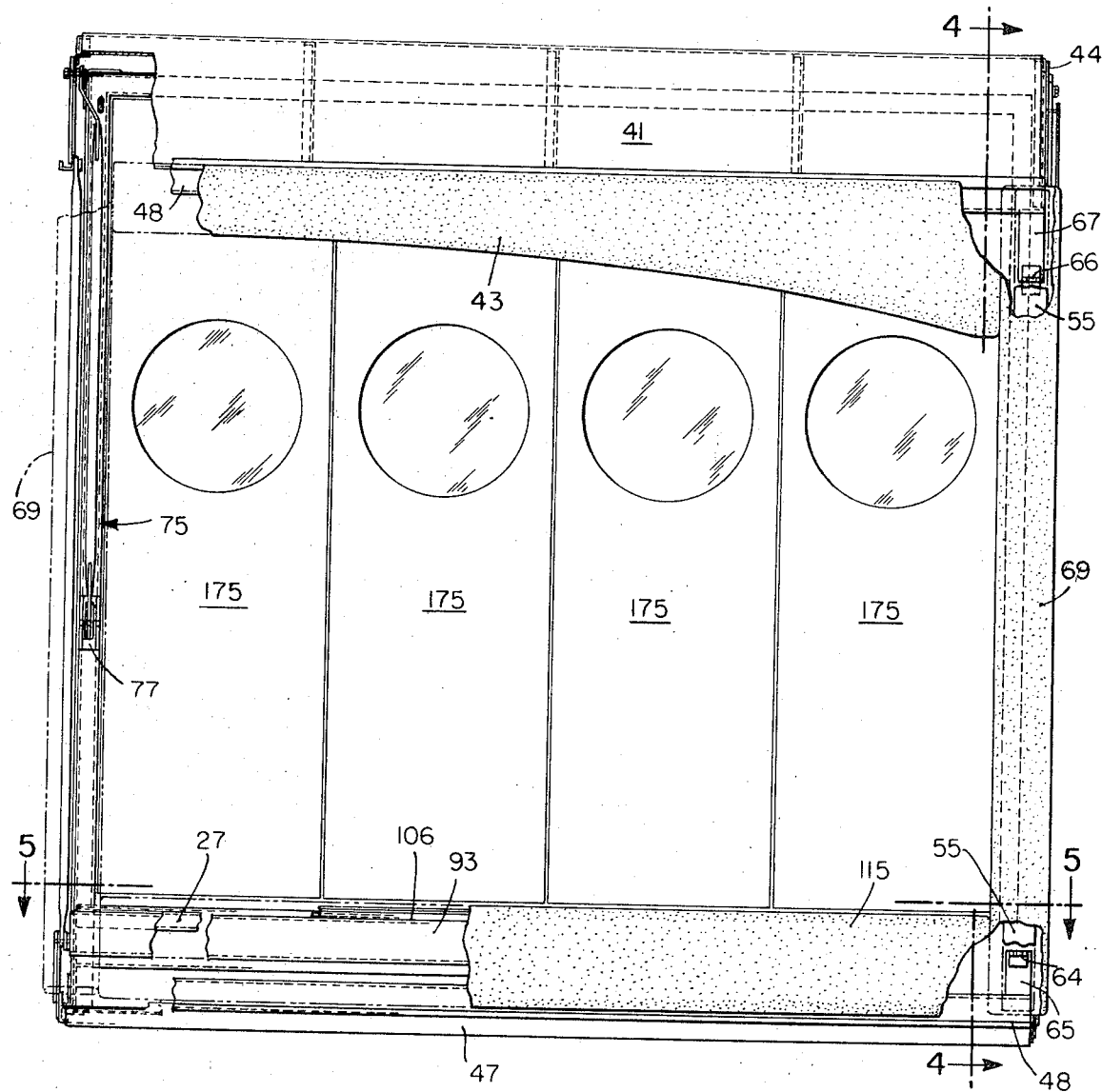
FIG. 3 is a front elevational view of the apparatus shown in FIG. 2.

FIG. 5 taken along the lines 5—5 of FIG. 3 with portions broken away and illustrating the threshold portion of the apparatus;

FIG. 6 is a sectional view taken along the lines 6—6 of FIG. 5;

FIG. 7 is a sectional view taken along the lines 7—7 of FIG. 5 and illustrating lateral sway controlling means for the mating apparatus;

FIG. 8 is a sectional view taken along the lines 8—8 of FIG. 7.

Figure 1:
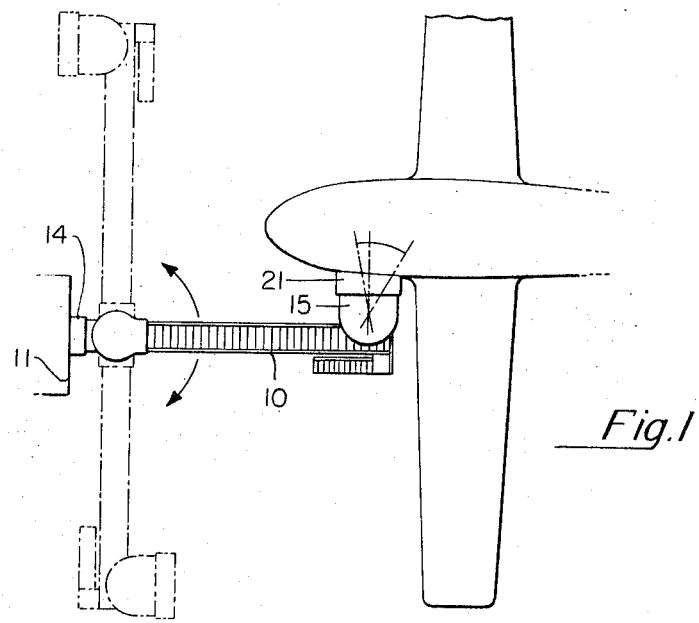
FIG. 1 is a plan view of the apparatus employed in operation to close the gap between a passenger walkway or gangway and a parked aircraft.

Referring to FIG. 1 of the drawing there is shown partly schematic, an arrangement embodying the mating apparatus of the present invention. The arrangement is shown as including a gangway or walkway 10 extending between a fixed terminal building 11 and a structure such as parked aircraft 15. The gangway includes a fixed inner end portion 14 which is secured to the building. The gangway or walkway is elongated and is mounted for horizontal and vertical swinging movement relative to the terminal building. The outer end of the walkway includes a vestibule structure 15 which is adapted to register with the doorway 17 of a vehicle 13 of a vehicle such as an airplane. In order to close the small remaining gap after the vestibule 15 is brought into register with the airplane the mating apparatus 21 of the present invention is provided. The mating apparatus will follow the lateral in-out excursions of the airplane with a gentle contact force.

Figure 4:
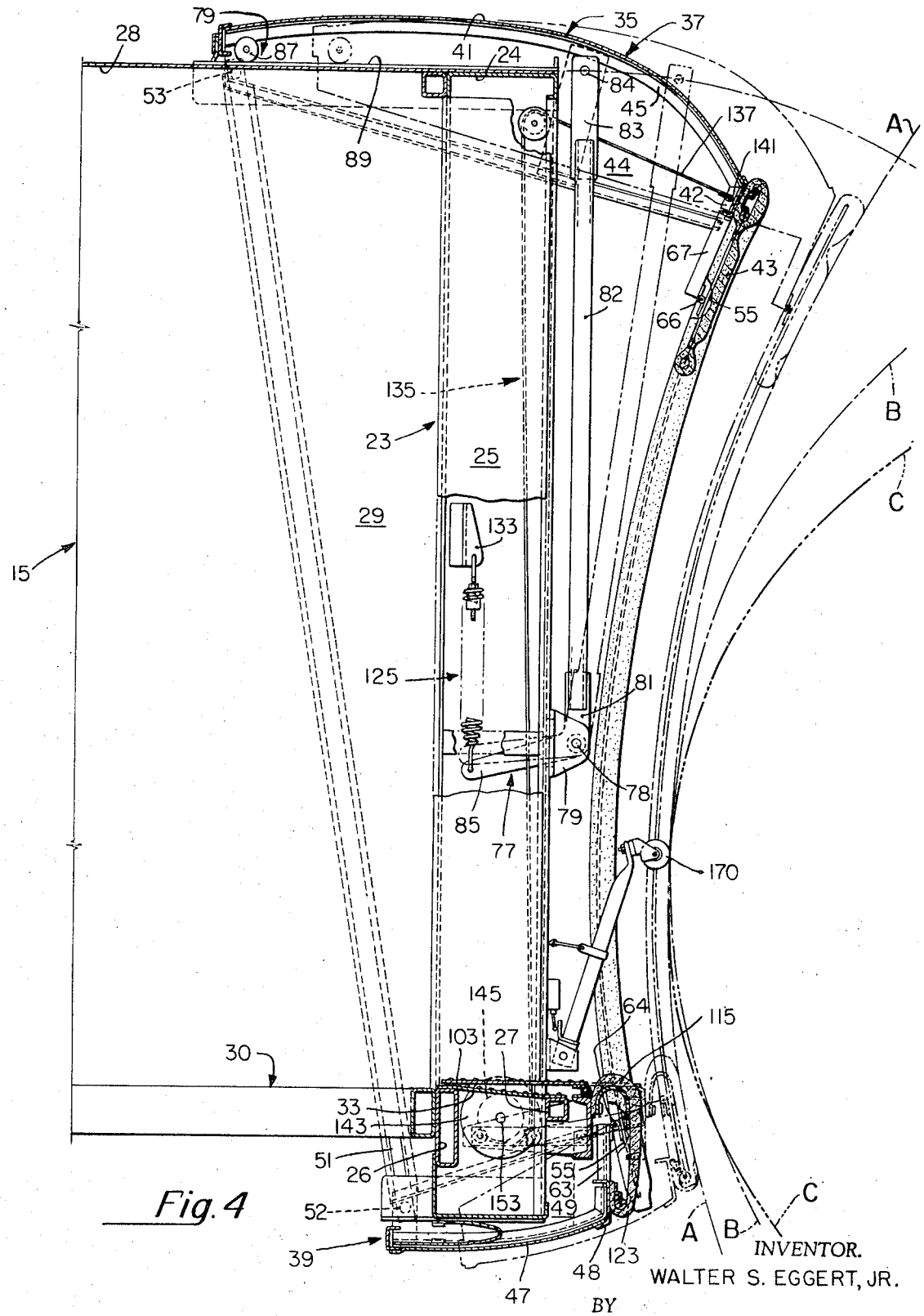
FIG. 4 is a vertical elevational view taken along the lines 4—4 of FIG. 3 and showing certain guide and actuating means for extending and retracting the apparatus relative to the walkway.

In accordance with the present invention and as seen in FIGS. 2,3,4 the mating apparatus 21 of the present invention including an interior rectangular attachment frame 23 which constitutes a rigid structure. The frame is composed of a top member 24, side channel members 25, and a bottom rectangular tube member 26, and a smaller rectangular tube member 27 which is secured to the front face portions of the opposite side members 25. A first threshold plate 33 overlays and is supported by the top surfaces of members 26, 27. The top and side members 24, 25 and bottom tubular members 26 engage and are respectively secured to the roof portion 28, sidewalls 29, and floor 30 of the end of the vestibule structure 15. When so attached the top, side and bottom frame members become integral with the roof, sidewalls and floor structure of vestibule and provide support for movable canopy means 35. The latter canopy means consist of upper canopy means 37, and lower canopy means 39. The upper canopy means 37 is generally hood shaped being generally of inverted trough shape and extending across the full width of the vestibule to rest on the tops of the sidewalls of the vestibule. The trough includes a curved central portion 41, terminating in a forward downturned reinforcing member 42 which carries a horizontally disposed contact pad 43 which makes contact with the upper marginal surface of the doorway opening of the aircraft. The trough also includes opposed sidewalls 44 which also depend downwardly from the curved top portion. Reinforcing ribs 45 are spaced across the trough and disposed in fore-and-aft relation to provide stiffness to the trough.

The lower canopy means 39 is of generally similar construction as the upper trough means and is disposed in upright relationship. The lower canopy means include a central curved bottom sheet member 37 terminating in a forward upright channel member 48 and opposed opposite upstanding sidewall members 49. Hanger members 51 are pivotally connected at their lower ends to the rear portions of the side member of the lower trough. The hanger members extend upwardly and rearwardly as seen in FIG. 4 and their upper ends are connected by means of a pivotal connection as at 53 to the rear end portions of the downwardly depending side members 44 of the upper trough members. A pair of vertical band or strap members 55 are attached at opposite ends of the upper and lower canopy members, see FIG. 2. The left strap of the pair of straps is hinged as at 57 to an upwardly projecting portion 58 of the front wall 48 of the lower canopy and to the left end portion of the front wall 42 by means of hinge 62. The right-hand strap member 55 is fastened at its lower end by means of a hinge connection as at 64 to an upward projection 65 of the right-hand front wall portion of the lower trough member. The upper trough member includes a downwardly extending portion 67 to which is attached upper hinge means 66 which connect the upper portion of the right-hand strap member. The pair of vertical strap means 55 include contact pad material 69 which cushion the contact of the canopy with the skin surface of parked aircraft. In addition as seen in FIG. 3 the forward member 42 of the upper canopy means likewise carries suitable contact pad material 43 which extends between the left- and right-hand strap members 55. Due to the fact that mating apparatus of the present invention is adapted to make contact with the forward door of an aircraft, and as a result of the fairing of the fuselage skin surfaces around such door, the right-hand portion of the contact pad material tapers downwardly transversely to a lower height on the right-hand side than on the left-hand side. Side curtain members 72 are secured at their upper edges to the sidewall 44 of the upper canopy 37 and to the upwardly projecting sidewall 49 of the lower canopy 39. The forward edges of the side curtain members are also secured to the rear edge portions of the front hanger straps 55.

Support means 75 are provided for the canopy means to enable in-out excursions of movement for the canopy means. For this purpose the upper canopy means is provided with bellcrank means 77 and roller cam means 76. Referring to FIGS. 2 and 4 the bellcrank means 77 are pivoted as at 78 to bracket support 26 mounted on the front edge portion of the sidewall 25 of the support frame 23. The vertical arm 81 of the bellcrank includes a rod 82 affixed thereto and which extends upwardly to a jogged end portion 83 which in turn is pivotally connected to the sidewall 44 of the upper canopy as at 84, see FIG. 3. The horizontal arm 85 of the bellcrank extends rearwardly and downwardly for a purpose to be later described. The aforementioned roller cam means 76 include roller means 87 which ride on cam element 89 in the present instance constituting a straight surface of angle member resting on the top sidewalls 29 of the vestibule structure. The angle member 87 supports the rear portion of the top canopy member and coupled with rod 82 enables programmed forwardly and downwardly movement of the upper canopy 35 upon clockwise movement of the bellcrank means 77. While the cam surface is a straight or planar surface it is apparent that the cam means could be made of curved surfaces or other configuration to vary the locus of movement of the upper canopy in its in-out excursions.

Lower support means 91 are provided for the lower canopy means 39 constituting threshold frame means having a transverse channel member 93 supported at opposite ends by extension linkages 95, see FIG. 5. The latter include a first link member 96 pivotally connected to the lower frame member 26 of the attachment frame means as at 97 and a second link 98 pivotally attached to the transverse threshold frame member 93 by pivot 99. The first and said second links 96, 98 are pivotally connected as at 100, and are of sufficient strength to support the passenger load carried on threshold plate 103 which is hinged as at 105 at its forward edge to the top 106 of the threshold frame member by means of a piano hinge, see FIG. 6. The inner end portion of the threshold plate slides over previously mentioned fixed plate 33 which overlays a lower portion of the attachment frame adjacent the floor level of the vestibule structure. The threshold plate 103 may be rotated about its hinge to a vertical position to enable servicing of the extension linkage means. The extreme outer ends of the aforementioned transverse threshold frame 93 carries a rearwardly extending rigid arm 107. The forward wall 40 of the lower canopy 39 includes an upstanding angle member 109 to which a link 111 is pivotally connected as at 112. The link 111 extends to the rear portion of the rigid arm 107 and is secured thereto by a pivot connection as at 113. A lower flexible contact pad means 115 having an inverted U-shaped upper portion is attached along its inner arm portion 119 thereof to the front face of the transverse threshold frame member 93. A springlike U-shaped metallic backup member 121 is disposed within the fold of the pad member to provide a slight cushioning effect and to provide form for the contact pad means. The lower edge portion of the contact pad likewise includes a U-shaped fold 123 and its inner arm of the U-portion is secured to the front wall 48 of the lower trough member 39. The material of the contact pad may be of a flexible resilient fireproof material such as asbestos padding.

With reference now to FIGS. 4 and 6 it is observed that the canopy apparatus may be moved from its full line position to its phantom line position forwardly thereof. In the latter position the contact pads of the canopy are in contact with the surface corresponding to line A—A which is representative of the outer skin curvature of a large commercial passenger airplane designated 747. The lines B—B and C—C represent correspondingly different cross-sectional fuselage shapes corresponding to different types of commercial airplanes. The extent of in-out excursion of the canopy and its conformation with one of the curved surfaces requires that the forward portion of the lower canopy 39 be able to move vertically to accommodate to differences in length of wrap surface. This follows because the upper canopy normally protrudes forwardly of the lower canopy surface. As the contact pads are bowed around the skin surface of the fuselage the straps 55 of the front upright pads are effective to control the elevation of the front portion of lower canopy. Thus in FIG. 6 it is noted as a result of the canopy being extended outwardly to conforming to surface A—A, the lower canopy is pulled upwardly by the side straps depending from the upper canopy frame. Since arm 107 affixed to threshold frame 93 travels only in a horizontal plane, the upward movement of the lower canopy is accomplished via connecting link 111 tilting upwardly as seen in its phantom line position.

In order to accomplish the forward movement of the canopy described above, spring means 125 are provided. With reference to FIG. 5, tension spring means 126 are shown anchored at one end to inner link 96 as at 127 and the outer end of the tension spring is anchored as at 128 to the transverse rectangular tubular frame member 27. With reference to FIG. 4, the upper canopy means is extended forwardly by means of tension spring 130 attached at its lower end at 131 to the free end of the horizontal arm 85 of the bellcrank 77. The upper end of tension spring 130 is anchored to bracket 133 affixed to sidewall of the attachment frame. In the absence of restraints the tension spring is thus effective to rotate the bellcrank means in a clockwise direction from the full line position of the canopy as shown to its phantom line position.

In order to control the extent to which the canopy means are extended, retracting means, in the form of cable means 135 is provided. A rope or cable 137 in the upper portion of FIG. 4 is shown passing over an idler pulley 139 mounted in the upper portion of side frame 25. The free end of the rope is attached to the forward wall 42 of the upper canopy member 35 as at 141. The rope extends vertically downwardly to wrap around the larger sheave 143 of a double sheave pulley 142. The smaller sheave 145 of the double sheave pulley has one end of a cable 146 affixed to it, while its other end is extended forwardly, see FIG. 5, and is attached to the transverse threshold frame 93 as at 147. In order to drive the double sheave means, a motor M and gearbox 148 are mounted on the front face of the lower frame member 26 of the attachment frame. A stub shaft 148 receiving power from the gearbox 149, through chain drive means 151 transmits rotative power to shaft 153 to which the double sheave pulley means are affixed. During nonmating operations of the apparatus of the invention, the double sheave pulley means are rotated in a direction to retract the canopy apparatus. Suitable spring-loaded biasing means may be provided to control the slack in the cable means.

With reference now to FIGS. 5, 7, and 8 means 157 are provided to limit the amount of pivotal and lateral swaying movement of the lower canopy frame 39. For this purpose, the movable threshold frame member 93 includes rigid tongue means 159 affixed to its inner face 160. As seen in FIG. 8 the tongue means is of rectangular tubular construction. A pair of rollers 161 secured to the horizontal arm 162 of angle bracket 163 engages opposite side surfaces 164 of the tongue member. The tongue member is of a sufficient length to accommodate the full outward extension or excursion of the canopy. When however the canopy is retracted by cable retracting means the inner end 165 of the tongue passes through aperture or opening 167 in the front wall 168 of lower attachment frame member 26.

In operation, the bridge or walkway 10 is brought to the airplane using controls forming part of the bridge and not constituting part of this invention. The bridge is then raised and the threshold frame 93 is leveled with the floor of the airplane by the bridge operator. The bridge is then extended or moved toward the airplane so that the vestibule 15 registers with the doorway in the airplane. A pair of sensors 170 likewise not forming part of this invention automatically stop the movement of the bridge approximately a slight distance approximately 8 inches from the airplane. The remaining gap is closed by the apparatus of the present invention.

The motor M adjacent the threshold frame 93 is energized in a direction to play out cables 135 and 146. The slack so provided enables the tension springs 125 forming part of the threshold frame and the tension spring 130 associated with the bellcrank means 79 to extend the upper and lower canopy so that contact is made with the fuselage surface of the aircraft. With all of the cables slack the springs 125, 130 cause the canopy means to follow any in and out excursions of the airplane due to wind or shifting of weight. After mating, the safety doors 175 are opened and the plane door is opened into the bridge.

While there has been described what at present is considered to be the preferred embodiment of this invention, it will be obvious to those skilled in the art that various changes and modifications may be made therein without departing from the invention and it is aimed in the appended claims to cover all such changes and modifications.

We claim:

1. Closure apparatus for a walkway having a floor and sidewalls for closing the gap between said walkway and a structure such as a parked airplane having a doorway opening therein, comprising, canopy means mounted on the end of the walkway, means supporting said canopy means between a retracted position and a forward extended position relative to the end of said walkway, resilient means urging said canopy means to said forward extended position, retracting means normally opposing said resilient means to secure said canopy means in said retracted position and releasable to enable said resilient means to urge said canopy means forwardly into pressure contact with said structure, said canopy means including upper canopy means extending transversely across the top of said sidewalls, said supporting means including rod means mounted to said sidewalls to impart forward and downward movement to said upper canopy means, and said supporting means including roller means mounted on canopy means, said roller means being supported for rolling movement on said sidewalls, whereby said supporting means and said roller means impart forwardly and downward movement to said upper canopy means.

2. In the closure apparatus as set forth in claim 1 wherein said canopy means include lower canopy means positioned beneath said walkway, and means for supporting said lower canopy means to said upper canopy means.

3. In the closure apparatus as set forth in claim 2 and including threshold frame means mounted for forward extensible and retractable movement relative to said walkway, and hinge link means connecting said lower canopy means to said threshold frame means, said hinge link means supporting said lower canopy means for vertical pivotal movement.

4. In the closure apparatus as set forth in claim 2 wherein said supporting means include rear hanger strap means, and pivot means connecting said strap means to said upper and said lower canopy means.

5. In the closure apparatus as set forth in claim 2 wherein said support means include front hanger strap means, and hinge means securing opposite end portions of said front hanger strap means to said upper and said lower canopy means.

6. In the closure apparatus as set forth in claim 5 wherein said front hanger strap means include front face portions thereof and resilient contact pad material affixed to said front face portions.

7. In the closure apparatus as set forth in claim 5 and including lower contact pad means extending between said front hanger strap means secured at its upper margins to said threshold frame means and at its lower margins to said lower canopy means.

8. In the closure apparatus as set forth in claim 7 and including upper transverse contact pad means secured to said upper canopy means and having side margins terminating adjacent said front hanger straps.

9. In the closure apparatus as set forth in claim 2 and including side curtain means secured to said upper canopy and said lower canopy means.

10. Closure apparatus for a passenger walkway having a floor and sidewall members for mating with a doorway opening in a structure, comprising in combination, threshold walk plate means, means mounting said walk plate means adjacent said floor for forward and rearward movement, means for urging said threshold walk plate means forwardly, transverse canopy means mounted for movement on said sidewalls above said threshold plate means, means connected to said sidewall for urging said canopy means through a predetermined locus forwardly and downwardly, said canopy means including transverse plate means positioned beneath said threshold plate means, hanger means supporting said transverse plate means to said canopy means, and contact pad means affixed to said canopy means and said hanger means, and interconnecting said transverse plate means to said threshold plate means for contact with the margins of said doorway opening of said structure.

* * * * *